US011101663B2

(12) United States Patent
Zhang et al.

(10) Patent No.: US 11,101,663 B2
(45) Date of Patent: Aug. 24, 2021

(54) MICROGRID SYSTEM AND METHOD OF CONTROLLING SAME

(71) Applicant: EAST GROUP CO., LTD., Guangdong (CN)

(72) Inventors: Tao Zhang, Guangdong (CN); Wei Yu, Guangdong (CN); Haibo Xu, Guangdong (CN); Jianhui Su, Guangdong (CN)

(73) Assignee: EAST GROUP GO., LTD., Guangdong (CN)

( * ) Notice: Subject to any disclaimer, the term of this patent is extended or adjusted under 35 U.S.C. 154(b) by 598 days.

(21) Appl. No.: 16/074,382

(22) PCT Filed: Oct. 8, 2016

(86) PCT No.: PCT/CN2016/101491
§ 371 (c)(1),
(2) Date: Jul. 31, 2018

(87) PCT Pub. No.: WO2017/133269
PCT Pub. Date: Aug. 10, 2017

(65) Prior Publication Data
US 2021/0194250 A1    Jun. 24, 2021

(30) Foreign Application Priority Data

Feb. 1, 2016 (CN) .......................... 201610071182.0

(51) Int. Cl.
*H02J 3/32* (2006.01)
*H02M 1/00* (2006.01)
(Continued)

(52) U.S. Cl.
CPC ................ *H02J 3/388* (2020.01); *H02J 3/32* (2013.01); *H02J 3/381* (2013.01);
(Continued)

(58) Field of Classification Search
CPC ....... H02M 2001/0025; H02J 3/32–322; H02J 3/388
See application file for complete search history.

(56) References Cited

U.S. PATENT DOCUMENTS 6,693,409 B2 * 2/2004 Lynch ..................... H02J 3/383
                                                          323/208
2011/0317460 A1 * 12/2011 Garces Rivera .......... H02J 3/38
                                                          363/127
(Continued)

FOREIGN PATENT DOCUMENTS

CN          101969281 A      2/2011
CN          102185341 A      9/2011
(Continued)

OTHER PUBLICATIONS

X. Chen, Y. H. Wang and Y. C. Wang, "A novel seamless transferring control method for microgrid based on master-slave configuration,", Jun. 3, 2013, IEEE, 2013 IEEE ECCE Asia Downunder. (Year: 2013).*

(Continued)

*Primary Examiner* — Hal Kaplan
*Assistant Examiner* — David A Shiao
(74) *Attorney, Agent, or Firm* — Intellectual Property Law Group LLP

(57) ABSTRACT

A microgrid system and method of controlling same, the microgrid system comprising a storage battery (5000), an energy storage converter (1000), a monitoring circuit and a controllable switch (2000). When the microgrid system is in grid-connected mode, the energy storage converter outputs steady power under the control of an inner current loop unit (1220); in grid-connected mode, an outer voltage loop unit (1240) does not participate in control, but remains in an operating state, and on the basis of four outer voltage loop unit input signals, estimates in advance a specified current (Continued)

loop signal ($U_{vo}$) for handover from grid-connected mode to island mode. When the microgrid system hands over from grid-connected mode to island mode, the outer voltage loop unit goes into operation, and the inner current loop unit controls a steady output voltage and frequency from the energy storage converter according to the pre-estimated specified current loop signal output by the outer voltage loop unit. The outer voltage loop unit controls the outputted specified current loop signal to be identical before and after mode handover, and can realize seamless handover between grid-connected and island modes for the microgrid system.

10 Claims, 4 Drawing Sheets

(51) Int. Cl.
*H02J 3/38* (2006.01)
*H02J 13/00* (2006.01)

(52) U.S. Cl.
CPC ..... *H02J 13/00002* (2020.01); *H02J 2300/24* (2020.01); *H02M 2001/0025* (2013.01)

(56) References Cited

U.S. PATENT DOCUMENTS

| | | | |
|---|---|---|---|
| 2012/0057383 A1* | 3/2012 | Wei | H02M 7/53871 363/98 |
| 2014/0192567 A1 | 7/2014 | Balocco | |
| 2018/0219380 A1* | 8/2018 | Dong | H02J 3/38 |

FOREIGN PATENT DOCUMENTS

| | | |
|---|---|---|
| CN | 103414207 A | 11/2013 |
| CN | 104600748 A | 5/2015 |
| CN | 104734193 A | 6/2015 |
| CN | 105552962 A | 5/2016 |
| CN | 205429759 U | 8/2016 |
| JP | 2015133785 A | 7/2015 |

OTHER PUBLICATIONS

Y. A. I. Mohamed and A. A. Radwan, "Hierarchical Control System for Robust Microgrid Operation and Seamless Mode Transfer in Active Distribution Systems," May 16, 2011, IEEE, IEEE Transactions on Smart Grid, vol. 2, No. 2, pp. 352-362. (Year: 2011).*
O. Palizban and K. Kauhaniemi, "Microgrid control principles in island mode operation," Jun. 16, 2013, IEEE, 2013 IEEE Grenoble Conference. (Year: 2013).*
S. M. Ashabani and Y. A. I. Mohamed, "New Family of Microgrid Control and Management Strategies in Smart Distribution Grids—Analysis, Comparison and Testing," Mar. 4, 2014, IEEE, IEEE Transactions on Power Systems, vol. 29, No. 5, pp. 2257-2269. (Year: 2014).*
H. Minxiao, S. Xiaoling, L. Shaobo and Z. Zhengkui, "Transient analysis and control for microgrid stability controller," Jun. 16, 2013, IEEE, 2013 IEEE Grenoble Conference. (Year: 2013).*
China Office Action dated Jul. 21, 2017 for corresponding China application No. 201610071182.0 with English translation, 10 pages total.
China Office Action dated Mar. 16, 2018 for corresponding China application No. 201610071182.0, with English translation, 18 pages total.
International Search Report, dated Jan. 20, 2017 for corresponding International Application No. PCT/CN2016/101491 with English translation.
Written Opinion, dated Jan. 6, 2017 for corresponding International Application No. PCT/CN2016/101491.

* cited by examiner

MICROGRID SYSTEM AND METHOD OF CONTROLLING SAME

CROSS-REFERENCE TO RELATED APPLICATIONS

This application is a U.S. National Phase application, under 35 U.S.C. § 371, of International Application no. PCT/CN2016/101491, with an international filing date of Oct. 8, 2016, and claims benefit of China Application no. CN 201610071182.0 filed on Feb. 1, 2016, each of which are hereby incorporated by reference for all purposes.

TECHNICAL FIELD

The present disclosure relates generally to the technical field of power supply, and more particularly, to a microgrid system and a control method thereof.

BACKGROUND

A microgrid system is a small power distribution sub-grid including distributed power generation devices, energy storage converters and loads, and having certain capabilities of self-regulation and self-control. It can operate in a grid-connected mode, as well as operate in an island mode when a power grid breaks down. Microgrid technology has promoted the development of renewable energy utilization and distributed generation, and has attracted the attention of countries around the world.

In the microgrid system, the energy storage converter is the core of the entire microgrid system, which stores energy when operating in the grid-connected mode, and serves as a main power source of the microgrid system when operating in the island mode, to provide support of voltage and frequency for the entire microgrid system. Currently, the core problem of the microgrid system is how to reduce switching impact caused when the microgrid system is switched from the grid-connected mode to the island mode, to realize a seamless switching. However, there are still technical difficulties in realizing the seamless switching in the traditional technology, which may even cause the microgrid system to be unstable.

SUMMARY

Based on the above, in view of how to reduce the switching impact caused when the microgrid system is switched from the grid-connected mode to the island mode, the present disclosure provides a microgrid system and a method for controlling the same, which can reduce the switching impact caused when the microgrid system is switched from the grid-connected mode to the island mode, and realize the seamless switching from the grid-connected mode to the island mode.

A microgrid system is provided, including a storage battery, an energy storage converter, a monitoring circuit and a controllable switch, wherein the controllable switch is connected between a utility grid and an alternating current bus, the energy storage converter is connected to the storage battery and the alternating current bus respectively, and the monitoring circuit is connected to the energy storage converter and the controllable switch respectively.

The monitoring circuit is configured to monitor an operating state of the utility grid, output a first monitoring signal when the utility grid is normal, and output a second monitoring signal when the utility grid is abnormal. The controllable switch is configured to be switched on under control of the first monitoring signal, so that the microgrid system operates in parallel to the utility grid operate and enters a grid-connected mode. The controllable switch is further configured to be switched off under control of the second monitoring signal, so that the microgrid system independently supplies power to a load and enters an island mode.

The energy storage converter includes a main circuit and a control circuit. The main circuit is configured to process an output voltage of the storage battery for grid-connected operation or supplying power to the load. The control circuit is configured to control an output of the main circuit. The control circuit includes an outer voltage loop unit, a mode switching switch, and an inner current loop unit.

A first input end of the inner current loop unit is connected to an output end of the energy storage converter, to receive an output current feedback value of the energy storage converter. A second input end of the inner current loop unit is connected to a fixed end of the mode switching switch. An output end of the inner current loop unit is connected to the main circuit. A first contact of the mode switching switch is configured to receive a specified inner current loop current value.

A first input end of the outer voltage loop unit is connected to the output end of the energy storage converter, to receive an output voltage feedback value of the energy storage converter. A second input end of the outer voltage loop unit is configured to receive a specified outer voltage loop voltage value. A third input end of the outer voltage loop unit is connected to the utility grid through the controllable switch, to receive a utility grid current value. A fourth input end of the outer voltage loop unit is configured to receive the specified inner current loop current value. An output end of the outer voltage loop unit is connected to a second contact of the mode switching switch. The outer voltage loop unit is configured to generate a specified current loop signal when the microgrid system is switched from the grid-connected mode to the island mode, based on the specified inner current loop current value input by the fourth input end of the outer voltage loop unit, the utility grid current value input by the third input end of the outer voltage loop unit, the specified outer voltage loop voltage value input by the second input end of the outer voltage loop unit and the output voltage feedback value of the energy storage converter input by the first input end of the outer voltage loop unit.

The mode switching switch is configured to be switched to the first contact under control of the first monitoring signal, and the inner current loop unit generates a control signal based on the specified inner current loop current value input by the first contact and the output current feedback value of the energy storage converter, to control the energy storage converter to output a constant power. The mode switching switch is further configured to be switched to the second contact under control of the second monitoring signal, and the inner current loop unit generates a control signal based on the specified current loop signal output by the outer voltage loop unit and the output current feedback value of the energy storage converter, to control an output voltage and frequency of the energy storage converter to be constant.

In one embodiment, the main circuit includes a converter, the control circuit further includes a driving signal generator, the driving signal generator is connected between the output end of the inner current loop unit and a control end of the converter, the driving signal generator is configured to generate a corresponding driving signal based on the control signal, to control the converter.

In one embodiment, the main circuit further includes a filtering circuit, and the filtering circuit is connected between an output end of the converter and the alternating current bus, and is configured to perform filtering processing of an output of the converter.

In one embodiment, the inner current loop unit includes a current loop adder and a current loop controller connected in series, an output end of the current loop adder is connected to the current loop controller, an output end of the current loop controller is connected to the driving signal generator, the current loop adder is configured to subtract one input signal of the first input end and one input signal of the second input end from each other to obtain an error signal, and the current loop controller is configured to generate a control signal based on the error signal.

In one embodiment, the outer voltage loop unit includes a first voltage loop adder, a voltage loop controller and a second voltage loop adder connected in series, the voltage loop controller is connected between the first voltage loop adder and the second voltage loop adder, the first voltage loop adder is configured to subtract voltage signals input by the first input end and the second input end from each other to obtain a voltage error value, the voltage loop controller is configured to generate a control quantity based on the voltage error value, and the second voltage loop adder is configured to generate a specified current loop signal by adding together the utility grid current value input by the third input end, the specified inner current loop current value input by the fourth input end and the control quantity.

In one embodiment, the current loop controller and the voltage loop controller are both PI regulators.

In one embodiment, the inner current loop unit further includes a first three-phase static coordinate system to two-phase rotary coordinate system converting module and a two-phase rotary coordinate system to three-phase static coordinate system converting module. The current loop adder includes a current loop d-axis adder and a current loop q-axis adder. The current loop controller includes a current loop d-axis controller and a current loop q-axis controller; an input end of the first three-phase static coordinate system to two-phase rotary coordinate system converting module is connected to the output end of the energy storage converter, and an output end of the first three-phase static coordinate system to two-phase rotary coordinate system converting module is connected to the current loop d-axis adder and the current loop q-axis adder respectively. The first three-phase static coordinate system to two-phase rotary coordinate system converting module is configured to convert a three-phase current output by the energy storage converter, to generate a d-axis current and a q-axis current. An input end of the two-phase rotary coordinate system to three-phase static coordinate system converting module is connected to output ends of the current loop d-axis controller and the current loop q-axis controller respectively, and an output end of the two-phase rotary coordinate system to three-phase static coordinate system converting module is connected to the driving signal generator. The two-phase rotary coordinate system to three-phase static coordinate system converting module is configured to convert a quantity output by the current loop d-axis controller and a quantity output by the current loop q-axis controller into a three-phase modulated signal, and output the three-phase modulated signal to the driving signal generator to generate a driving control signal for the converter.

The outer voltage loop unit further includes a second three-phase static coordinate system to two-phase rotary coordinate system converting module and a third three-phase static coordinate system to two-phase rotary coordinate system converting module. The first voltage loop adder includes a first voltage loop d-axis adder and a first voltage loop q-axis adder. The voltage loop controller includes a voltage loop d-axis controller and a voltage loop q-axis controller. The second voltage loop adder includes a second voltage loop d-axis adder and a second voltage loop q-axis adder. An input end of the second three-phase static coordinate system to two-phase rotary coordinate system converting module is connected to the output end of the energy storage converter, and an output end of the second three-phase static coordinate system to two-phase rotary coordinate system converting module is connected to input ends of the first voltage loop d-axis adder and the first voltage loop q-axis adder respectively. The second three-phase static coordinate system to two-phase rotary coordinate system converting module is configured to convert a three-phase voltage output by the energy storage converter to generate a d-axis voltage and a q-axis voltage. An input end of the third three-phase static coordinate system to two-phase rotary coordinate system converting module is configured to receive a utility grid current. An output end of the third three-phase static coordinate system to two-phase rotary coordinate system converting module is connected to the second voltage loop d-axis adder and the second voltage loop q-axis adder respectively. The third three-phase static coordinate system to two-phase rotary coordinate system converting module is configured to convert a three-phase current of the utility grid to generate a d-axis current and a q-axis current. The specified inner current loop current value includes a specified inner current loop d-axis current value and a specified inner current loop q-axis current value. The specified outer voltage loop voltage value includes a specified outer voltage loop d-axis voltage value and a specified outer voltage loop q-axis voltage value.

The mode switching switch includes a d-axis mode switching switch and a q-axis mode switching switch. The d-axis mode switching switch is connected between the current loop d-axis adder and the second voltage loop d-axis adder. The q-axis mode switching switch is connected between the current loop q-axis adder and the second voltage loop q-axis adder.

In one embodiment, the microgrid system further includes a photovoltaic power generation module, the photovoltaic power generation module includes a photovoltaic cell module and a photovoltaic inverter connected to the photovoltaic cell module. The photovoltaic power generation module is configured to convert light energy into electric energy to supply power to the load, and output the electric energy to a power grid or the storage battery when the generated electric energy is greater than an electric quantity required by the load.

In one embodiment, the microgrid system further includes a main controller, the main controller is configured to acquire an importance level of the load, and distribute electric energy based on the importance level of the load when the microgrid system is in the island mode.

A control method of a microgrid system is further provided. The control method is configured to control a microgrid system according to any one of the above embodiments to be switched between the grid-connected mode and the island mode is provided. The method includes:

monitoring the operating state of the utility grid;

determining whether or not the utility grid is in the normal state;

controlling the controllable switch to be switched on if the utility grid is in the normal state, so that the microgrid system operates in parallel to the utility grid and enters the grid-connected mode, wherein the mode switching switch is controlled to be switched to the first contact, the inner current loop unit generates the control signal based on the specified inner current loop current value input by the first contact and the output current feedback value of the energy storage converter, to control the energy storage converter to output the constant power, the outer voltage loop unit generates the specified current loop signal when the microgrid system is switched from the grid-connected mode to the island mode, based on the specified inner current loop current value input by the fourth input end of the outer voltage loop unit, the utility grid current value input by the third input end of the outer voltage loop unit, the specified outer voltage loop voltage value input by the second input end of the outer voltage loop unit and the output voltage feedback value of the energy storage converter input by the first input end of the outer voltage loop unit, and the specified current loop signal does not participate in a control process of the inner current loop unit during grid connection; and controlling the controllable switch to be switched off if the utility grid is not in the normal state, so that the microgrid system independently supplies power to the load and enters the island mode, wherein the mode switching switch is controlled to be switched to the second contact from the first contact, the specified current loop signal generated during grid connection is output to the inner current loop unit by the outer voltage loop unit, and the inner current loop unit generates the control signal based on the output current feedback value of the energy storage converter and the specified current loop signal output by the outer voltage loop unit, to control the output voltage and frequency of the energy storage converter to be constant.

The controllable switch is controlled to be switched on and the mode switching switch is controlled to be switched to the first contact by the monitoring circuit of the microgrid system when the utility grid is abnormal, the microgrid system enters the grid-connected mode, and the inner current loop unit generates the control signal based on the specified current loop current value and the output current feedback value of the energy storage converter, so that the energy storage converter of the microgrid system is controlled to have a constant output power. The outer voltage loop unit does not participate in the control in the grid-connected mode, but remains in an operating state, and generates the specified current loop signal when the microgrid system is switched from the grid-connected mode to the island mode, based on four input signals of the outer voltage loop unit, that is, the specified inner current loop current value, the utility grid current value, the specified outer voltage loop voltage value and the output voltage feedback value of the energy storage converter. When the monitoring circuit monitors that the utility grid is abnormal, the controllable switch is controlled to be switched off and the mode switching switch is controlled to be switched to the second contact, and when the microgrid system is switched from the grid-connected mode to the island mode, the inner current loop unit generates the control signal based on the specified current loop signal output by the outer voltage loop unit and the output current feedback value of the energy storage converter, to control the output voltage and frequency of the energy storage converter to be constant. In the above microgird system, the specified current loop signals output by the outer voltage loop unit are the same before and after the mode is switched, without a significantly sudden change, which reduces the switching impact caused when the microgrid system is switched from the grid-connected mode to the island mode, and realizes the seamless switching from the grid-connected mode to the island mode.

DETAILED DESCRIPTION OF EMBODIMENTS

In order to more clearly illustrate the microgrid system provided in the present disclosure, the specific description will be provided as below with reference to embodiments.

Figure 1:
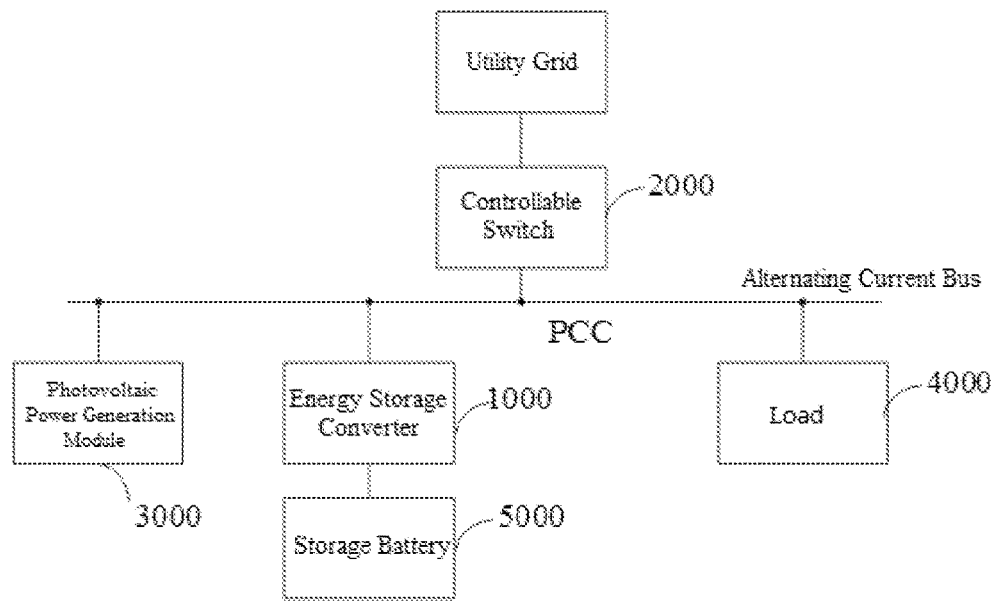
FIG. 1 is a structural schematic diagram illustrating a microgrid system according to one embodiment.

A microgrid system operable in a grid-connected mode and an island mode is shown in FIG. 1. The microgrid system includes a storage battery 5000, an energy storage converter 1000, a controllable switch 2000, a photovoltaic power generation module 3000, a monitoring circuit (not shown), and a main controller (not shown). One end of the controllable switch 2000 is connected to a utility grid, and the other end is connected to an alternating current bus through a PCC (Point of Common Coupling). One end of the energy storage converter 1000 is connected to the storage battery, and the other end is connected to the alternating current bus. The monitoring circuit is connected to the energy storage converter 1000 and the controllable switch 2000 respectively.

The monitoring circuit is configured to monitor an operating state of the utility grid and output a first monitoring signal when the utility grid is normal, and output a second monitoring signal when the utility grid is abnormal. In this embodiment, the utility grid being normal means that the voltage of the utility grid is in a stable state without any sharp change (in which the voltage has a great increase or decrease in a short time) and can be normally output to supply power to a load. The utility grid being abnormal means that the voltage of the utility grid is in an unstable state or in an interrupted state (that is, cannot be normally output to supply power to a load).

The controllable switch 2000 is configured to be switched on under control of the first monitoring signal so that the microgrid system operates in parallel to the utility grid and enters the grid-connected mode, and the controllable switch 2000 is further configured to be switched off under control of the second monitoring signal, so that the microgrid system independently supplies power to a load 4000 and enters the island mode.

The photovoltaic power generation module 3000 is configured to convert light energy into electric energy to supply power to the load 4000, and output the electric energy to a power grid or the storage battery when the generated electric energy is greater than an electric quantity required by the load 4000. The photovoltaic power generation module 3000 includes a photovoltaic cell module and a photovoltaic inverter.

The main controller is configured to acquire an importance level of the load, and distribute the electric energy based on the importance level of the load 4000 when the microgrid system is in the island mode. The load 4000 generally includes a primary load and a controllable load.

In the above microgrid system, the monitoring circuit outputs the first monitoring signal when the utility grid is normal, and controls the controllable switch 2000 to be switched off, and the microgrid system operates in the grid-connected mode. When the microgrid system operates in the grid-connected mode, both of the photovoltaic power generation module 3000 and the power grid simultaneously supply power to the load 4000. If the power output by the photovoltaic power generation module 3000 is greater than the power of the load 4000, the photovoltaic power generation module 3000 outputs redundant electric energy to the power grid or charge the storage battery 5000 through the energy storage converter 1000, thereby enabling the storage battery 5000 to store enough energy. The monitoring circuit outputs the second monitoring signal when the utility grid is abnormal, and controls the controllable switch 2000 to be switched off, and the microgrid system operates in the island mode. The energy storage converter 1000 may be switched from the grid-connected mode to the island mode quickly, thereby providing support of constant voltage and frequency for the entire microgrid system. At this time, the photovoltaic power generation assembly 3000 and the storage battery 5000 simultaneously supply power to the load 4000. The main controller also detects the power of the load 4000, and cuts off the controllable load when detecting that the power of the load 4000 is greater than the sum of the output powers of the photovoltaic power generation module 3000 and the storage battery 500 (i.e., the power of the load 4000 exceeds the power supply capacities of the photovoltaic power generation module 3000 and the storage battery 5000), thereby only supplying power to the primary load, to ensure continuous power supply to the primary load.

In other embodiments, other distributed energy sources such as a diesel generator, a wind power generation system, or the like, may be used in the microgrid system to replace the photovoltaic power generation module in this embodiment, or may be provided in the microgrid system together with the photovoltaic power generation module in this embodiment, to provide a stronger energy supply capacity.

The above energy storage converter 1000 adopts a PQ control strategy in the grid-connected mode, and adopts a VF control strategy in the island mode, thereby providing support of voltage and frequency for the entire microgrid system to ensure uninterrupted power supply to the load 4000. Based on the principle of energy conservation, the energy storage converter 1000, in the grid-connected mode, has previously taken related measures to avoid the present of switching impact when the energy storage converter 1000 is switched from the grid-connected mode to the island mode. The related principles of the energy storage converter 1000 will be detailed introduced below.

Figure 2:
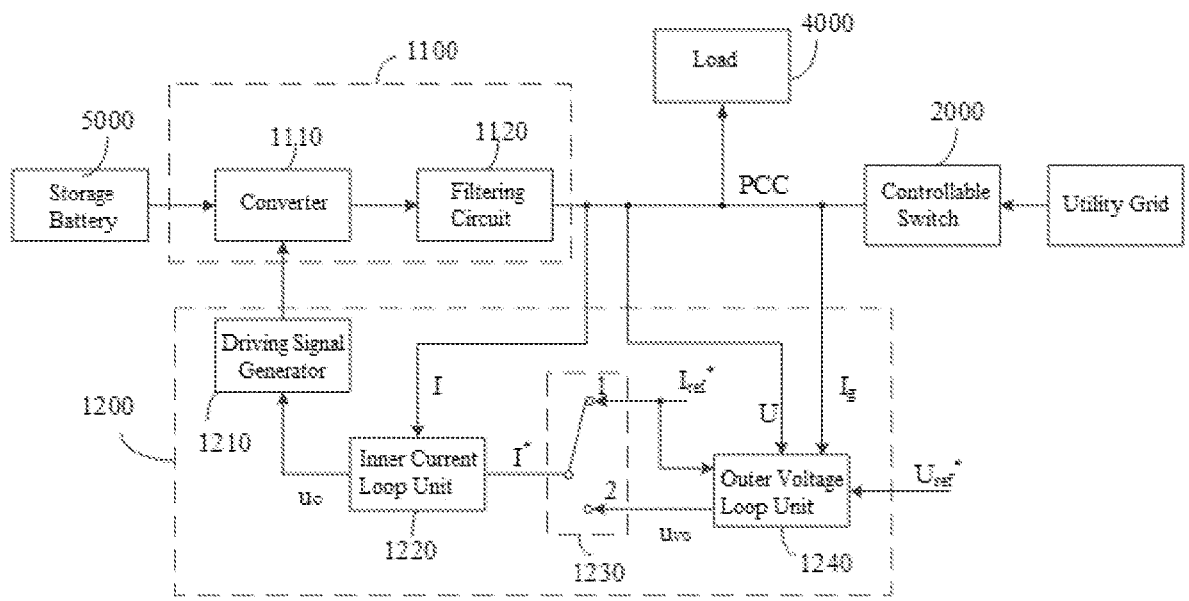
FIG. 2 is a circuit block diagram illustrating an energy storage converter of the microgrid system according to the embodiment shown in FIG. 1.

FIG. 2 is a circuit block diagram illustrating the energy storage converter shown in FIG. 1. Referring to FIG. 2, the energy storage converter 1000 includes a main circuit 1100 and a control circuit 1200. The main circuit 1100 is configured to process an output voltage of the storage battery 5000 to supply power to the power grid or the load 4000. The main circuit 1100 includes a converter 1110 and a filtering circuit 1120. The filtering circuit 1120 is connected between an output end of the converter 1110 and a PCC point, and is configured to perform filtering processing of an output of the converter 1110. Specifically, the filtering circuit 1120 is a LC filtering circuit. In this embodiment, the converter 1110 is a bidirectional converter. During the grid-connected mode, when the stored energy of the storage battery 5000 is lower than a preset value, the utility grid or the photovoltaic power generation module 3000 charges the storage battery 5000 via the converter 1110 to supplement the energy loss of the storage battery 5000. During the island mode, the converter 1110 is configured to convert the electric energy output from the storage battery 5000 to supply power to the load 4000.

The control circuit 1200 is a main executive circuit of the PQ control strategy and the VF control strategy described above, and is configured to control the output of the main circuit 1100. The control circuit 1200 includes a driving signal generator 1210, an inner current loop unit 1220, a mode switching switch 1230, and an outer voltage loop unit 1240.

A first input end of the outer voltage loop unit 1240 is connected to the output end of the converter 1110, to receive an output voltage feedback value U of the converter 1110. A second input end of the outer voltage loop unit 1240 is configured to receive a specified outer voltage loop voltage value $U_{ref}^*$. A third input end of the outer voltage loop unit 1240 is connected to the alternating current bus, and is connected to the utility grid through the controllable switch 2000, to receive a utility grid current value Ig. A fourth input end of the outer voltage loop unit 1240 is configured to receive the specified inner current loop current value $I_{ref}^*$. An output end of the outer voltage loop unit 1240 is connected to a second contact 2 of the mode switching switch 1230. The outer voltage loop unit 1240 is configured to subtract the specified outer voltage loop voltage value $U_{ref}^*$ and the output voltage feedback value U of the converter 1110 from each other to obtain a voltage error value. The voltage error value is processed by a voltage loop controller to generate a control quantity, and the control quantity, the specified inner current loop current value $I_{ref}^*$ and the utility grid current value $I_g$ are added together to obtain a specified current loop signal $u_{vo}$.

Figure 3:
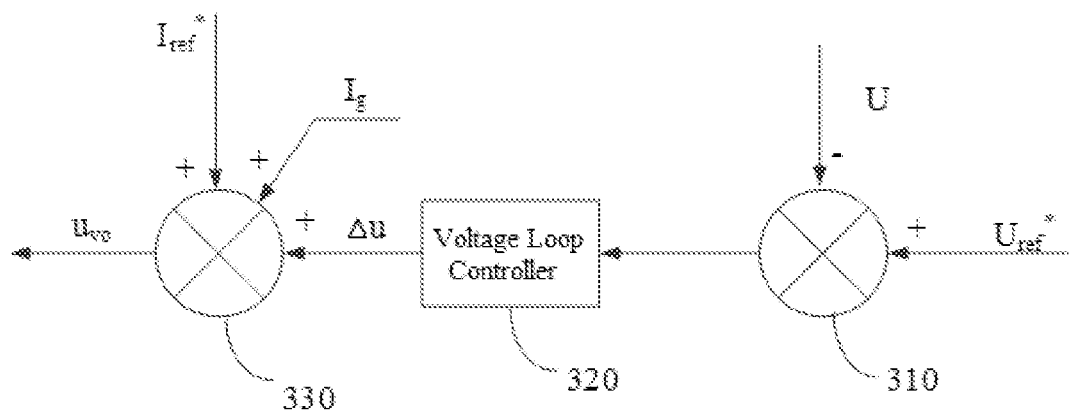
FIG. 3 is a circuit schematic diagram illustrating an outer voltage loop unit in the embodiment shown in FIG. 2.

A circuit schematic diagram illustrating the outer voltage loop unit 1240 is shown in FIG. 3. Referring to FIG. 3, the outer voltage loop unit 1240 includes a first voltage loop adder 310, a voltage loop controller 320 and a second voltage loop adder 330 connected in series. The voltage loop controller 320 is connected between the first voltage loop adder 310 and the second voltage loop adder 330. The first voltage loop adder 310 is configured to subtract the output voltage feedback value U of the converter 1110 input by the first input end of the outer voltage loop unit 1240 and the specified outer voltage loop voltage value $U_{ref}^*$ input by the second input end from each other to obtain the voltage error value. The voltage loop controller 320 is configured to generate the control quantity Δu based on the voltage error value. The second voltage loop adder 330 is configured to add together the utility grid current value Ig input by the third input end of the outer voltage loop unit 1240, the specified inner current loop value $I_{ref}^*$ input by the fourth input end and the control quantity Δu generated by the voltage loop controller 320, to obtain the specified current loop signal $u_{vo}$ when switching from the grid-connected mode to the island mode. Therefore, the specified current loop signal $u_{vo}$ is:

$$u_{vo} = \Delta u + I_{ref}^* + I_g.$$

Δu, $I_{ref}^*$, and the like all indicate a control quantity obtained from the voltage or the current, and do not indicate a current value or a voltage value. The outer voltage loop unit 1240 is kept in an operating state, thus the load power that the microgrid system needs to take when being switched from the grid-connected mode to the island mode can be estimated in advance during grid connection.

Referring to FIG. 2, a first input end of the inner current loop unit 1220 is connected to the output end of the energy storage converter 1000, to receive an output current feedback value I of the energy storage converter 1000. A second input end of the inner current loop unit 1220 is connected to fixed end of the mode switching switch 1230, to receive current signal I* transmitted from the fixed end. An output end of the inner current loop unit 1220 is connected to the converter 1110 through the driving signal generator 1210. A first contact 1 of the mode switching switch 1230 is configured to receive the specified inner current loop current value $I^{ref*}$. The second contact 2 of the mode switching switch 1230 is configured to receive the specified current loop signal $u_{vo}$ output by the outer voltage loop unit 1240.

Figure 4:
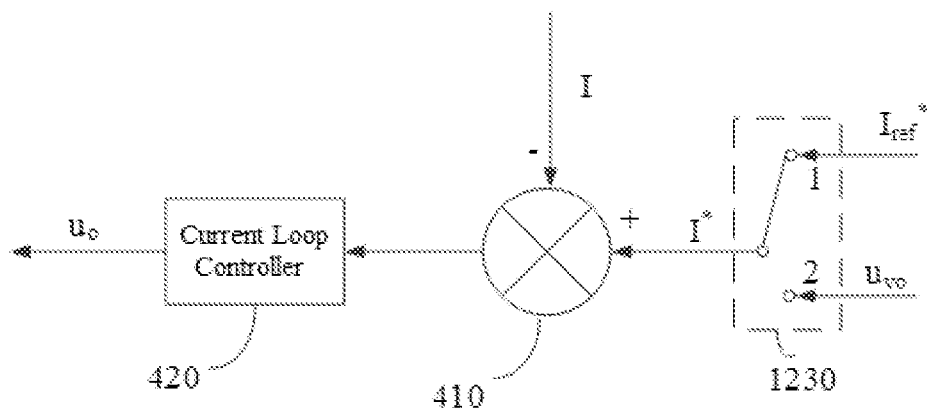
FIG. 4 is a circuit schematic diagram illustrating an inner current loop unit in the embodiment shown in FIG. 2.

The specific configuration of the inner current loop unit 1220 is shown in FIG. 4. Referring to FIG. 4, the inner current loop unit 1220 includes a current loop adder 410 and a current loop controller 420 connected in series. An output end of the current loop adder 410 is connected to the current loop controller 420, and an output end of the current loop controller 420 is connected to the driving signal generator 1210. The current loop adder 410 is configured to subtract two input signals of the first input end and the second input end from each other to obtain an error signal, and the current loop controller 420 is configured to generate a control signal $u_o$, based on the error signal, thereby controlling the output of the energy storage converter 1000. In this embodiment, the current loop controller 420 and the voltage loop controller 320 are both PI regulators. Specifically, when the mode switching switch 1230 is switched to the first contact 1 under the control of the first monitoring signal, that is, when the microgrid system is in the grid-connected mode, the current signal I* input by the second input end of the current loop adder 410 is the specified inner current loop current value $I_{ref}^*$, the current loop adder 410 subtracts the specified inner current loop current value $I_{ref}^*$ and the output current feedback value I of the converter 1110 from each other to obtain the error signal, and the current loop controller 420 is configured to generate the control signal $u_o$ based on the error signal. When the mode switching switch 1230 is switched from the first contact 1 to the second contact 2 under the control of the second monitoring signal, that is, when the microgrid system is switched from the grid-connected mode to the island mode, the current signal I* input by the second input end of the current loop adder 410 is the specified current loop signal $u_{vo}$ output by the outer voltage loop unit 1240. Compared with the specified inner current loop current value $I_{ref}^*$ input by the second input end during grid connection, an estimated amount increased when the mode is switched is:

$$u_{vo} - I_{ref}^* = (\Delta u + I_{ref}^* + Ig) - I_{ref}^* = \Delta u + Ig.$$

Therefore, the output power of the energy storage converter 1000 is maintained unchanged before and after the mode is switched, which avoids a system protection caused by a sudden change of the output current resulted by output saturation of the regulator created when a conventional voltage loop is instantaneously input. The current loop adder 410 is configured to subtract the specified current loop signal $u_{vo}$ output by the outer voltage loop unit 1240 and the output current feedback value I of the converter 1110 from each other to obtain the error signal, and the current loop controller 420 is configured to generate the control signal $u_o$ based on the error signal.

The driving signal generator 1210 is configured to generate a driving signal based on the control signal $u_o$ output by the current loop controller 420, to control the converter 1110. In one embodiment, the driving signal generator 1210 is an SPWM signal generator and the converter 1110 is a PWM converter.

The monitoring circuit in the above microgrid system controls the controllable switch 2000 to be switched on and controls the mode switching switch 1230 to be switched to the first contact 1 when the utility grid is normal, the microgrid system enters the grid-connected mode, and the inner current loop unit 1220 generates the control signal $u_o$ based on the specified inner current loop current value $I_{ref}^*$ and the output current feedback value I of the energy storage converter, so that the energy storage converter 1000 of the microgrid system is controlled to have a constant output power. The outer voltage loop unit 1240 does not participate in the control in the grid-connected mode, but remains in an operating state, and subtracts the specified outer voltage loop voltage value $U_{ref}^*$ and the output voltage feedback value U of the converter 1110 from each other to obtain a voltage error value, the voltage loop controller 320 processes the voltage error value to generate the control quantity Δu, and the control quantity Δu, the specified inner current loop current value $I_{ref}^*$ and the utility grid current value $I_g$ are added together to obtain a specified current loop signal $u_{vo}$. When the monitoring circuit monitors that the utility grid is abnormal, the controllable switch 2000 is controlled to be switched off and the mode switching switch 1230 is controlled to be switched to the first contact 2, and when the microgrid system is switched from the grid-connected mode to the island mode, the inner current loop unit 1220 generates the control signal $u_o$ based on the specified inner current loop current value $I_{ref}^*$ output by the outer voltage loop unit 1240 and the output current feedback value I of the energy storage converter 1000, to control the output voltage and frequency of the energy storage converter 1000 to be constant. In the above microgrid system, the specified current loop signals $u_{vo}$ output by the outer voltage loop unit 1240 are the same before and after the mode is switched, without a significantly sudden change, which reduces the switching impact caused when the microgrid system is switched from the grid-connected mode to the island mode, and realizes the seamless switching from the grid-connected mode to the island mode.

Figure 5:
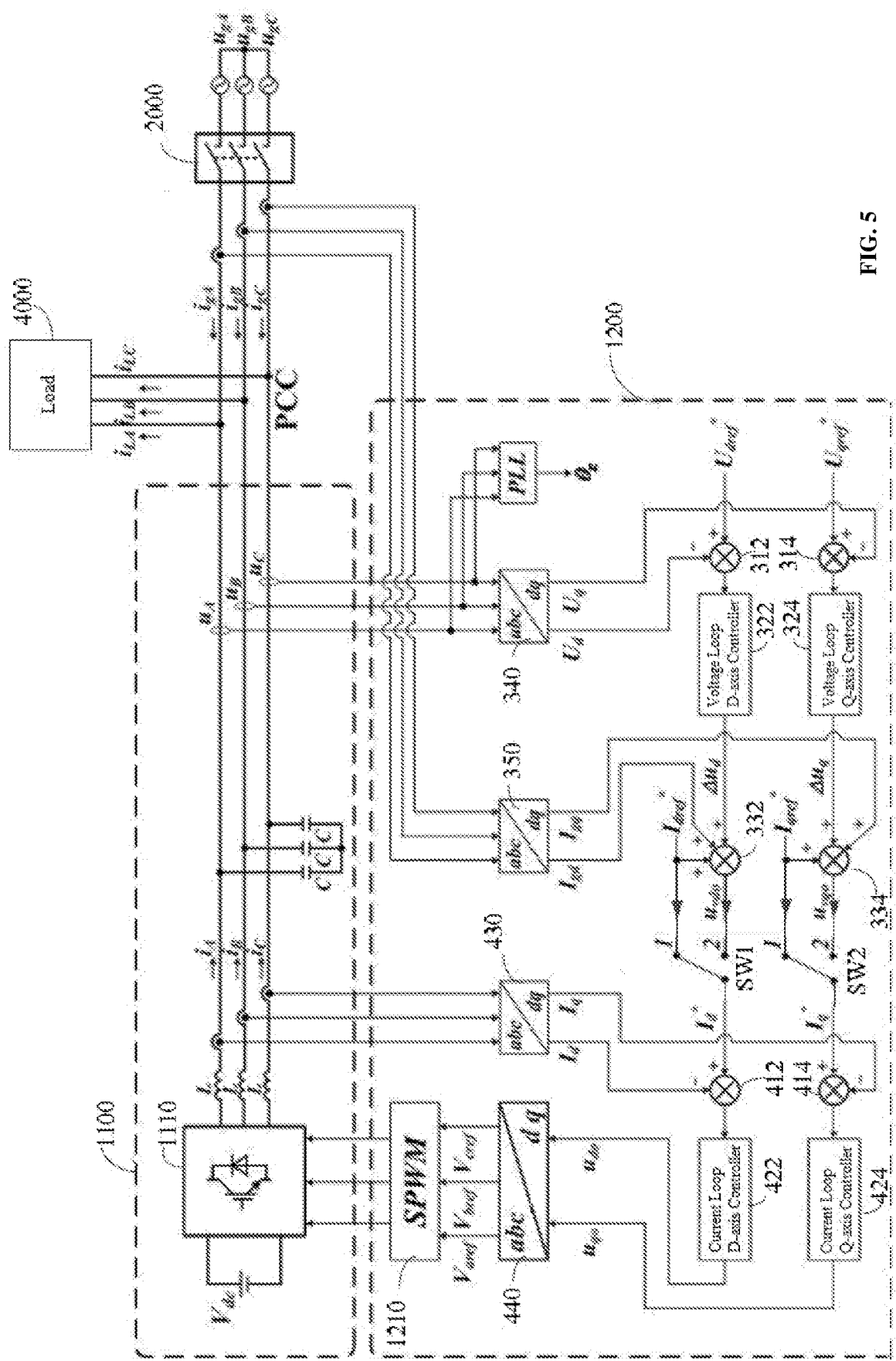
FIG. 5 is a circuit schematic diagram illustrating an energy storage converter in a microgrid system according to one embodiment.

FIG. 5 is a circuit schematic diagram illustrating a microgrid system according to one embodiment. In this embodiment, to ensure that the output power of the energy storage converter meets the actual demand of the load, the control circuit processes the reactive power and the active power respectively to obtain corresponding control signals of the active and reactive power, to control the output of the energy storage converter. Therefore, the inner current loop unit 1220 includes a d-axis branch and a q-axis branch, and the outer voltage loop unit 1240 similarly includes a d-axis branch and a q-axis branch. The mode switching switch includes a d-axis mode switching switch SW1 and a q-axis mode switching switch SW2. The d-axis mode switching switch SW1 is connected between the d-axis branch of the inner current loop unit and the d-axis branch of the outer voltage loop unit, and the q-axis mode switching switch SW2 is connected between the q-axis branch of the inner current loop unit and the q-axis branch of the outer voltage loop unit.

In this embodiment, the outer voltage loop unit 1240 further includes a second three-phase static coordinate system to two-phase rotary coordinate system converting module (i.e., abc/dq converting module) 340 and a third three-phase static coordinate system to two-phase rotary coordinate system converting module (i.e., abc/de converting module) 350, and the second three-phase static coordinate system to two-phase rotary coordinate system converting module 340 and the third three-phase static coordinate system to two-phase rotary coordinate system converting module 350 are both configured to realize the conversion from the abc three-phase static coordinate system to the dq two-phase rotary coordinate system. The first voltage loop adder 310 includes a first voltage loop d-axis adder 312 and a first voltage loop q-axis adder 314. The voltage loop controller 320 includes a voltage loop d-axis controller 322 and a voltage loop q-axis controller 324. The second voltage loop adder 330 includes a second voltage loop d-axis adder 332 and a second voltage loop q-axis adder 334. The specified outer voltage loop voltage value $U_{ref}^*$ includes a specified outer voltage loop d-axis voltage value $U_{dref}^*$ and a specified outer voltage loop q-axis voltage value $U_{qref}^*$. An input end of the second three-phase static coordinate system to two-phase rotary coordinate system converting module 340 (i.e., the first input end of the outer voltage loop unit 1240) is connected to the output end of the converter 1110, and an output end of the second three-phase static coordinate system to two-phase rotary coordinate system converting module 340 is connected to input ends of the first voltage loop d-axis adder 312 and the first voltage loop q-axis adder 314 respectively. The other input ends of the first voltage loop d-axis adder 312 and the first voltage loop q-axis adder 314 (i.e., the second input end of the outer voltage loop unit 1240) are configured to receive the specified outer voltage loop d-axis voltage value $U_{dref}^*$ and the specified outer voltage loop q-axis voltage value $U_{qref}^*$ respectively. An input end of the third three-phase static coordinate system to two-phase rotary coordinate system converting module 350 (i.e., the third input end of the outer voltage loop unit 1240) is connected to the utility grid through the controllable switch 2000, and is configured to receive the utility grid current value. Specifically, the input end of the third three-phase static coordinate system to two-phase rotary coordinate system converting module 350 is connected to a three-phase power grid current ($i_{gA}$, $i_{gB}$ and $i_{gC}$) on the power grid side of the PCC point. An output end of the third three-phase static coordinate system to two-phase rotary coordinate system converting module 350 is connected to the second voltage loop d-axis adder 332 and the second voltage loop q-axis adder 334 respectively. Meanwhile, the second voltage loop d-axis adder 332 and the second voltage loop q-axis adder 334 both have two further input ends, one input end of which is connected to the voltage loop d-axis controller 322 and the voltage loop q-axis controller 324 respectively, and the other input end (i.e., the forth input end of the outer voltage loop unit 1240) is connected to a specified inner current loop d-axis current value $I_{dref}^*$ and a specified inner current loop q-axis current value $I_{qref}^*$ Respectively. The first voltage loop d-axis adder 312 is sequentially connected to the voltage loop d-axis controller 322 and the second voltage loop d-axis adder 332 to form the d-axis branch of the outer voltage loop unit 1240. The first voltage loop q-axis adder 314 is sequentially connected to the voltage loop q-axis controller 324 and the second voltage loop q-axis adder 334 to form the q-axis branch of the outer voltage loop unit 1240.

The second three-phase static coordinate system to two-phase rotary coordinate system converting module 340 is configured to receive a three-phase output voltage $u_A$, $u_B$, $u_C$ of the converter 1110, and to convert the $u_A$, $u_B$, $u_C$ from the abc three-phase static coordinate system to the dq two-phase rotary coordinate system, thereby generating a d-axis voltage $U_d$ and a q-axis voltage $U_q$, and then respectively transmitting the generated d-axis voltage $U_d$ and q-axis voltage $U_q$ to the first voltage loop d-axis adder 312 and the first voltage loop q-axis adder 314. The input d-axis voltage $U_d$ and the specified outer voltage loop d-axis voltage value $U_{dref}^*$ are subtracted by the first voltage loop d-axis adder 312 to obtain the voltage error signal. The voltage loop d-axis controller 322 generates the control quantity $\Delta u_d$ based on the voltage error signal output by the first voltage loop d-axis adder 312. The third three-phase static coordinate system to two-phase rotary coordinate system converting module 350 receives the three-phase power grid current $i_{gA}$, $i_{gB}$, $i_{gC}$ of the power grid on the side of the PCC point, and converts the $i_{gA}$, $i_{gB}$, $i_{gC}$ from the abc three-phase static coordinate system to the dq two-phase rotary coordinate system to obtain a d-axis current $I_{gd}$ and a q-axis current $I_{gq}$ of the utility grid. The obtained d-axis current $I_{gd}$ and q-axis current $I_{gq}$ are then output to the second voltage loop d-axis adder 332 and the second voltage loop q-axis adder 334. The specified inner current loop d-axis current value $I_{dref}^*$ input by the input end, the d-axis current $I_{gd}$ of the utility grid and the control quantity $\Delta u_d$ output by the voltage loop d-axis controller 322 are added together by these second voltage loop d-axis adder 332 to obtain a specified current signal $u_{vdo}$, $u_{vdo} = \Delta u_d + I_{gd} + I_{dref}^*$. The working principle of the q-axis branch formed by the first voltage loop q-axis adder 314, the voltage loop q-axis controller 324 and the second voltage loop q-axis adder 334 is the same as the working principle of the d-axis branch, and is not described repeatedly herein.

Specifically, the inner current loop unit 1220 further includes a first three-phase static coordinate system to two-phase rotary coordinate system converting module (i.e, the abc/dq converting module) 430 and a two-phase rotary coordinate system to three-phase static coordinate system converting module (i.e, the dq/abc converting module) 440. The first three-phase static coordinate system to two-phase rotary coordinate system converting module 430 is configured to realize the conversion from the abc three-phase static coordinate system to the dq two-phase rotary coordinate system, that is, a three-phase current $i_A$, $i_B$ and $i_C$) output by the converter 1110 is converted to generate a d-axis current $I_d$ and a q-axis current $I_q$. The two-phase rotary coordinate system to three-phase static coordinate system converting module 440 is configured to realize the conversion from the dq two-phase rotary coordinate system to the abc three-phase static coordinate system. The current loop adder 410 includes a current loop d-axis adder 412 and a current loop q-axis adder 414. The current loop controller 420 includes a current loop d-axis controller 422 and a current loop q-axis controller 424. The specified inner current loop current value $I_{ref}^*$ includes the specified inner current loop d-axis current value $I_{dref}^*$ and the specified inner current loop q-axis current value $I_{qref}^*$. Wherein, the current loop d-axis adder 412 and the current loop d-axis controller 422 are connected in series to form the d-axis branch of the inner current loop unit 1220. The current loop q-axis adder 414 and the current loop q-axis controller 424 are connected in series to form the q-axis branch of the inner current loop unit 1220.

Specifically, an input end of the first three-phase static coordinate system to two-phase rotary coordinate system converting module 430 is connected to the output end of the converter 1110, and an output end of the first three-phase static coordinate system to two-phase rotary coordinate system converting module 430 is connected to the current loop d-axis adder 412 and the current loop q-axis adder 414 respectively. An input end of the two-phase rotary coordinate system to three-phase static coordinate system converting module 440 is connected to the output ends of the current loop d-axis controller 422 and the current loop q-axis controller 424 respectively, and an output end of the two-phase rotary coordinate system to three-phase static coordinate system converting module 440 is connected to the driving signal generator (SPWM) 1210. The signal generator 1210 is connected between the output end of the inner current loop unit 1220 and a control end of the converter 1110. In this embodiment, the input d-axis current $I_d$ and a current signal $I_d^*$ input by the fixed end of the d-axis mode switching switch SW1 are subtracted by the current loop d-axis adder 412 to obtain the error signal. Specifically, when the d-axis mode switching switch SW1 is switched to the first contact 1, the current signal $I_d^*$ output by the fixed end is the specified current loop d-axis current value $I_{dref}^*$, and when the d-axis mode switching switch SW1 is switched to the second contact 2, the current signal $I_d^*$ output by the fixed end is the specified inner current loop signal $u_{vo}$ output by the outer voltage loop unit 1240. The current loop d-axis controller 422 generates a d-axis control signal $u_{do}$ based on the error signal output by the current loop d-axis adder 412. The working process of the q-axis branch of the inner current loop unit 1220 is the same as the working process of the d-axis branch. Therefore, the current loop q-axis controller 424 similarly generates a q-axis control signal $u_{qo}$. The two-phase rotary coordinate system to three-phase static coordinate system converting module 440 is configured to convert the d-axis control signal $u_{do}$ and the q-axis control signal $u_{qo}$ to generate a three-phase modulated signal ($V_{aref}$, $V_{bref}$ and $V_{cref}$). The driving signal generator 1210 generates a corresponding driving signal based on the three-phase modulated signal output by the two-phase rotary coordinate system to three-phase static coordinate system converting module 440, to control the converter 1110.

The working process of the above microgrid system is described as below.

I. Grid-Connected Mode

The monitoring circuit generates the first monitoring signal when monitoring that the utility grid supplies power normally. The controllable switch 2000 is switched on under the control of the first monitoring signal, so that the microgrid system enters the grid-connected mode. When in the grid-connected mode, the power grid and the microgrid system simultaneously supply power to the load. When in the grid-connected mode, the microgrid system adopts the PQ control strategy, that is, the converter 1110 is controlled to output the constant power. The microgrid system may be also connected to the power grid or charge the storage battery 5000 when the generating capacity of the photovoltaic power generation module 3000 is greater than the power of the load. Meanwhile, the d-axis mode switching switch SW1 and the q-axis mode switching switch SW2 both are switched to the first contact 1 under the control of the first monitoring signal, and the signals $I_d^*$, $I_q^*$ transmitted from the fixed ends of the d-axis mode switching switch SW1 and the q-axis mode switching switch SW2 are the specified inner current loop d-axis current value $I_{dref}^*$ and the specified inner current loop q-axis current value $I_{qref}^*$ respectively. Therefore, the error signal obtained by the current loop d-axis adder 412 and the current loop q-axis adder 414 are obtained by subtracting the specified inner current loop d-axis current value $I_{dref}^*$ and the d-axis current $I_d$ of the converter 1110 and subtracting the specified inner current loop q-axis current value $I_{qref}^*$ and the q-axis current $I_q$ of the converter 1110 respectively. At this time, the current loop d-axis controller 422 and the current loop q-axis controller 424 generate the control signals $u_{do}$ and $u_{qo}$ based on the error signals output by the corresponding adders. The three-phase modulated signal is generated by the driving signal generator 1210 based on the control signal to the converter 1110, so that the converter 1110 is controlled to output the constant power.

When in the grid-connected mode, the outer voltage loop unit 1240 does not participate in the output control of the converter 1110, but remains in the operating state. The outer voltage loop unit 1240 will calculate the specified current loop signal $u_{vo}$ (i.e., $u_{vdo}=\Delta u_d+I_{gd}+I_{dref}^*$, $u_{vqo}=\Delta u_q+I_{gq}+I_{qref}^*$) in advance, to provide the specified current signal $u_{vo}$ to the inner current loop unit 1220 when switching from the grid-connected mode to the island mode and during the island mode.

II. Switching from the Grid-Connected Mode to the Island Mode

The monitoring circuit outputs the second monitoring signal when monitoring that the utility grid is abnormal. The controllable switch 2000 is switched off under the control of the second monitoring signal, so that the microgrid system independently supplies power to the load 4000, and the entire microgrid system is switched from the grid-connected mode to the island mode. The energy storage converter 1000 adopts the control strategy of the outer voltage loop and the inner current loop (i.e., the VF control strategy), thereby outputting the constant voltage and frequency. The d-axis mode switching switch SW1 and the q-axis mode switching switch SW2 switches from state where the first contact is switched on to a state where the second contact is switched on, and the energy storage converter 1000 adopts the control strategy of the outer voltage loop and the inner current loop. At this time, the current signals $I_d^*$, $I_q^*$ transmitted from the fixed ends of the d-axis mode switching switch SW1 and the q-axis mode switching switch SW2 are the specified current loop signals (i.e., $u_{vdo}=\Delta_d+I_{gd}+I_{dref}^*$, $u_{vqo}=\Delta u_q+I_{gq}+I_{qref}^*$) output by the second voltage loop d-axis adder 332 and the second voltage loop q-axis adder 334 respectively. That is, the outer voltage loop unit 1240 has calculated the specified current loop signal $u_{vo}$ in advance before the mode is switched (i.e., in the grid-connected mode), therefore the output signal is unchanged before and after the mode is switched. An estimated amount $\Delta u+Ig$ is instantaneously increased when the mode is switched, therefore the output power of the converter 1100 is maintained unchanged before and after the mode is switched, which avoids the system protection caused by the sudden change of the output current resulted by the output saturation of the regulator created when the conventional voltage loop is instantaneously input.

In the above microgrid system, the specified current loop signal u output by the outer voltage loop unit 1240 is unchanged before and after the mode is switched, and is output to the inner current loop unit 1220 at the moment of the switching and after the switching. Specifically, during grid connection, the specified current loop signal u output by the outer voltage loop unit 1240 is: $u_{vdo}=\Delta u_d+I_{gd}+I_{dref}^*$, $u_{vqo}=\Delta u_q+I_{gq}+I_{qref}^*$. When the mode switching switch 1230 is switched to the second contact 2, the current signal I* which is output to the inner current loop unit 1220 by the fixed end of the mode switching switch 1230 is changed from the original specified current loop d-axis current value $I_{dref}^*$ and the specified inner current loop q-axis current value $I_{qref}^*$ to the specified inner current loop signal $u_{dvo}$ and the specified current loop signal $u_{vqo}$. Compared with the original specified inner current loop current values $I_{dref}^*$, $I_{qref}^*$, it is equivalent that the estimated amount $\Delta u_d+I_{gd}$ (or $\Delta u_q+I_{gq}$) is instantaneously increased when the mode is switched, so that the outer voltage loop unit 1240 outputs in a steady state before and after the mode is switched, and the output power of the energy storage converter 1000 is maintained unchanged before and after the mode is switched, which avoids the system protection caused by the sudden change of the output current resulted by the output saturation of the regulator created when the conventional voltage loop is instantaneously input, and thus realizes the seamless switching of the system switched from the grid-connected mode to the island mode.

The principle of the seamless switching at the moment when the mode is switched in this embodiment will be described below by taking the d-axis as an example.

When the microgrid system operates in the grid-connected mode, the current signal $I_d^*$ transmitted from the fixed end of the d-axis mode switching switch SW1 is the specified inner current loop current value $I_{dref}^*$. At this time, although the outer voltage loop unit 1240 does not participate in the control of the energy storage converter 1000, it keeps operating itself. In the grid-connected mode, the specified outer voltage loop d-axis voltage value $U_{dref}^*$ is substantially equal to the d-axis voltage $U_d$ of the energy storage converter 1000, therefore the voltage error value obtained by subtracting the d-axis voltage $U_d$ from the specified outer voltage loop d-axis voltage value $U_{dref}^*$ is small. And then the voltage loop d-axis controller 322 calculates the control quantity $\Delta u_d \approx 0$, thus the specified current loop signal $u_{vdo}$ output by the outer voltage loop unit 1240 is:

$$u_{vdo}=\Delta u_d+I_{gd}+I_{dref}^*=I_{gd}+I_{dref}^* \quad (1).$$

The above formula indicates that, in the grid-connected mode, the specified current loop signal $u_{vdo}$ output by the outer voltage loop unit 1240 is equal to the sum of the d-axis current $I_d^*$ output by the energy storage converter 1000 and the d-axis current $I_{gd}$ of the utility grid. If the d-axis current output by the energy storage converter 1000 is $I_d=0$ when the energy storage converter 1000 operates in the grid-connected mode with no load, the d-axis current $I_{gd}$ of the utility grid is equal to the load current.

Therefore, in order to realize the seamless and smooth switching at the moment when switching from the grid-connected mode to the island mode, the output power of the energy storage converter 1000 and the power of the load 4000 are required to be maintained unchanged before and after the switching. Then, based on the principle of power balance before and after the switching, the output power $P_{PCSI}$ of the energy storage converter 1000 in the island mode should be equal to the sum of the output power $P_{PCS0}$ of the energy storage converter 1000 and the power $P_g$ that the power grid provides to the load 4000 in the grid-connected mode, that is:

$$P_{PCSI}=P_g+P_{PCS0} \quad (2).$$

Then the d-axis current correspondingly converted is:

$$I_d=I_{gd}+I_{dref}^*=u_{vdo} \quad (3).$$

It can be seen from the formulas (1) and (3) that the formulas (1) and (3) are the specified current loop signals $u_{vdo}$ output by the outer voltage loop unit 1240 before and after the mode is switched respectively, which are both $I_{gd}+I_{dref}^*$, therefore the outer voltage loop unit 1240 outputs in a steady state before and after the mode is switched, which ensures that the output of the outer voltage loop unit 1240 has no great sudden change before and after the mode is switched, and avoids the current oscillating protection caused by the output saturation of the outer voltage loop unit 1240.

For example, suppose that before the mode is switched, the energy storage converter 1000 has an output power of 0 kW in the grid-connected mode, and the power grid outputs 10 kW to the load 4000, that is, $I_{dref}^*=I_d=0$, $I_{gd}=10$, then $u_{dvo}=I_{gd}+I_{dref}^*=10$, which indicates that the outer voltage loop unit 1240 has estimated in advance the portion of the power (i.e., 10 kW) that the energy storage converter 1000 needs to take after switching from the grid-connected mode to the island mode, which is originally output to the load 4000 by the power grid. When the power grid is disconnected, the power output from the power grid to the load 4000 is 0 kW, and the power of 10 kW originally supplied to the load 4000 by the power grid should all be transferred to be supplied to the load 4000 by the energy storage converter 1000.

Therefore, at the moment when switching from the grid-connected mode to the island mode, the power of the power grid is 0 kW, and the outer voltage loop unit 1240 is put into, that is, the outer voltage loop unit 1240 is connected to the inner current loop unit 1220 by the mode switching switch 1230. Since the outer voltage loop unit 1240 has calculated the specified current loop signal $u_{dvo}=I_{gd}+I_{dref}^*=10$ in advance. Therefore, as long as the mode switching switch 1230 is switched to the second contact, the $u_{vdo}$ calculated in advance by the outer voltage loop unit 1240 can be served as the specified current signal of the inner current loop unit 1220, and the energy storage converter 1000 is controlled to supply the power of 10 kW to the load 4000 both at the moment of the switching and after the switching, thereby the power supplied to the load 4000 is maintained in a consistent state before and after the mode is switched, and the outer voltage loop unit 1240 outputs in a steady state before and after the switching, which realizes the seamless and smooth switching from the grid-connected mode to the island mode.

Figure 6:
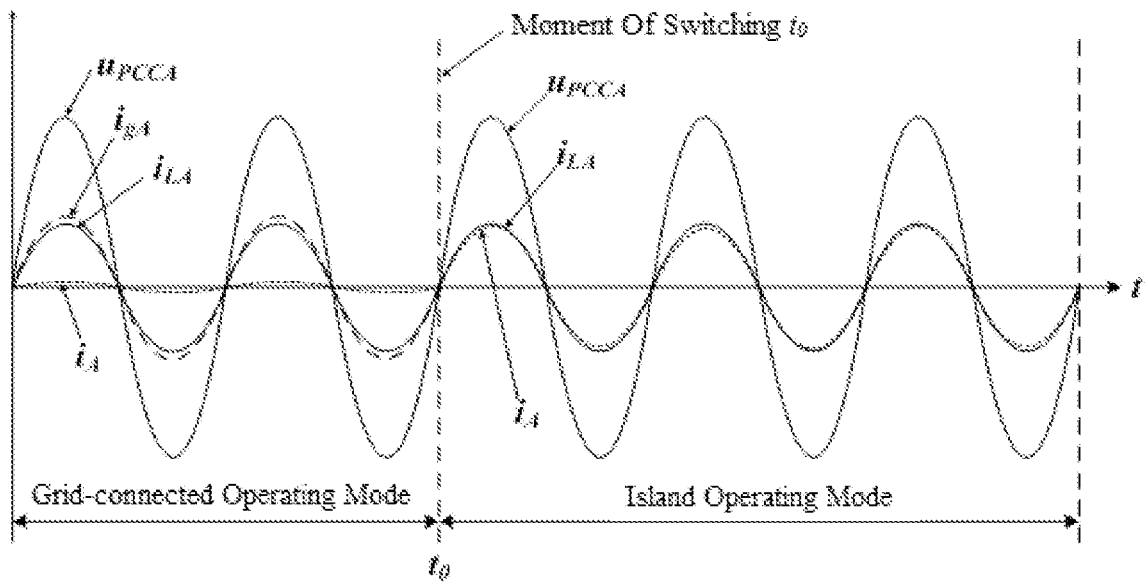
FIG. 6 is a schematic diagram illustrating an effect of a seamless switching process from a grid-connected mode to an island mode of the microgrid system shown in FIG. 5.
Figure 7:
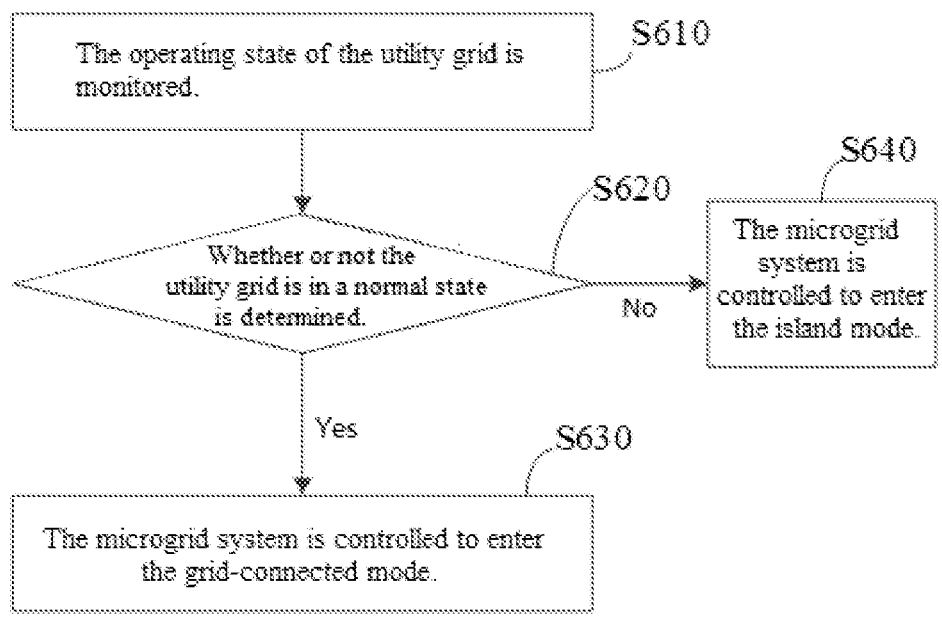
FIG. 7 is a flow diagram illustrating a control method of a microgrid system according to one embodiment.

FIG. 6 is a schematic diagram illustrating an effect of the seamless switching process from the grid-connected mode to the island mode of the microgrid system in this embodiment. An A-phase is taken as an example to illustrate the switching process in FIG. 6. $u_{PCCA}$ is an A-phase voltage of the power grid at the PCC point, $i_{gA}$ is an A-phase current of the power grid, $i_{LA}$ is an A-phase current of the load 4000, and $i_A$ is an A-phase output current of the energy storage converter 1000. Before the moment of $t_0$, the energy storage converter 1000 operates in the grid-connected mode, and the output of the stored energy is small, and the power supplied to the load 4000 is mainly provided by the power grid. Therefore, the current $i_{LA}$ of the load 4000 is almost equal to the current $i_{gA}$ of the power grid, that is, $i_{LA} \approx i_{gA}$. At the moment of to, the power grid is disconnected, the current $i_{gA}$ of the power grid is zero, and the energy storage converter 1000 is switched from the grid-connected mode to the island mode. At this time, the energy storage converter 1000 is served as the main power source to supply power to the load 4000, and the current $i_{LA}$ of the load 4000 is completely equal to the output current value $i_A$ of the energy storage converter 1000, that is, $i_{LA}=i_A$, so that the supply current to the load 4000 before and after switching from the grid-connected mode to the island mode is always maintained unchanged, and is transited smoothly before and after the switching, which solves the problem that the system protection is caused by the sudden change of the output current in the conventional switching manner for switching from the grid-connected mode to the island mode, thereby ensuring the continuous power supply to the load 4000 in the microgrid system.

III. Island Mode

When the utility grid is abnormal, under the control of the monitoring circuit, the controllable switch 2000 is switched off, and the mode switching switch 1230 is switched to the second contact. At this time the microgrid system is separated from the power grid. After finishing the switching, the energy storage converter 1000 adopts a constant voltage/constant frequency (VF control) control, that is, the control strategy of the outer voltage loop and the inner current loop.

In the specific implementation, since the power grid is powered off, the power grid stops supplying power to the load 4000, and meanwhile the specified d-axis and q-axis current values $I_{dref}^*$ and $I_{qref}^*$, are also stopped to be input. As a result, the specified current loop signal $u_{vdo}$ output by the outer voltage loop unit 1240 is $u_{vdo}=\Delta u_d+I_{gd}+I_{dref}^*=\Delta u_d+0+0=\Delta u_d$, $u_{vqo}=\Delta u_q+I_{gq}+I_{qref}^*=\Delta u_q+0+0=\Delta u_q$. Therefore the specified current loop signals $\Delta u_d$ and $\Delta u_q$ output by the outer voltage loop unit 1240 are served as the new specified current signals of the inner current loop unit 1220, and are subtracted from the corresponding current feedback signals $I_d$, $I_q$ of the energy storage converter 1000 to obtain the error signals Then the error signals are sent to the current loop d-axis controller and the current loop q-axis controller, and are calculated by the current loop d-axis controller and the current loop q-axis controller to output the control signals $u_{do}$ and $u_{qo}$. Then the control signals $u_{do}$ and $u_{qo}$ are converted from the dq two-phase rotary coordinate system to the abc three-phase static coordinate system to obtain the three-phase modulated signals $V_{aref}$, $V_{bref}$, $V_{cref}$, and finally SPWM modulation is performed to generate the driving signal to realize the control of the energy storage converter 1000. In the island mode, the energy storage converter 1000 is mainly served as the main power source to supply power to the load 4000. At this time, the current of the load 4000 $i_{LA}$ is completely equal to the output current value $i_A$ of the energy storage converter 1000, that is, $i_{LA}=i_A$.

In the microgrid system, the specified current loop signal output by the outer voltage loop unit 1240 is the same before and after the mode is switched, without a great sudden change, which reduces the switching impact caused when the microgrid system is switched from the grid-connected mode to the island mode, and realizes the seamless switching from the grid-connected mode to the island mode.

A control method of a microgrid system is also provided in the present disclosure, which is configured to control the microgrid system in the aforementioned embodiments to be switched between the grid-connected mode and the island mode is further provided. The flow of the control method is shown in FIG. 6, and includes the following steps.

At S610, the operating state of the utility grid is monitored.

The monitoring circuit monitors the operating state of the utility grid, which may generally monitor the parameters such as the current and the voltage in the power grid.

At S620, whether or not the utility grid is in a normal state is determined.

Whether or not the utility grid is normal is determined based on the monitored parameters, and if yes, proceed to S630, otherwise proceed to step S640.

At S630, the microgrid system is controlled to enter the grid-connected mode.

The controllable switch is controlled to be switched on, so that the microgrid system operates in parallel to the utility grid and enters the grid-connected mode. Meanwhile, the mode switching switch is controlled to be switched to the first contact, and the inner current loop unit generates the control signal based on the specified inner current loop current value input by the first contact and the output current feedback value of the energy storage converter, to control the energy storage converter to output a constant power. The specified current loop signal when the microgrid system is switched from the grid-connected mode to the island mode is generated by the outer voltage loop unit based on the specified inner current loop current value input by the fourth input end of the outer voltage loop unit, the utility grid current value input by the third input end of the outer voltage loop unit, the specified outer voltage loop voltage value input by the second input end of the outer voltage loop unit and the output voltage feedback value of the energy storage converter input by the first input end of the outer voltage loop unit. During grid connection, the specified current loop signal does not participate in the control process of the inner current loop unit.

At S640, the microgrid system is controlled to enter the island mode.

The controllable switch is controlled to be switched off, so that the microgrid system independently supplies power to the load and enters the island mode. Meanwhile, the mode switching switch is controlled to be switched to the second contact from the first contact, and the specified current loop signal generated during grid connection is output to the inner current loop unit by the outer voltage loop unit. The inner current loop unit generates the control signal based on the output current feedback value of the energy storage converter and the specified current loop signal output by the outer voltage loop unit, to control the output voltage and frequency of the energy storage converter to be constant.

The seamless switching of the microgrid system from the grid-connected mode to the island mode can be realized by the above control method.

The technical features of the above-described embodiments may be combined arbitrarily. To simplify the description, all the possible combinations of the technical features in the above embodiments are not described. However, all of the combinations of these technical features should be considered as within the scope recorded in the description as long as such combinations do not contradict with each other.

Although several implementations are merely expressed herein in the above embodiments with specific description, it should not be construed as limiting the scope of the invention patent. It should be noted that, for those skilled in the art, several variations and improvements may be made without departing from the concept of the present disclosure, which are all within the protection scope of the present disclosure. Therefore, the protection scope of the present disclosure shall be subject to the appended claims.

What is claimed is:

1. A microgrid system, comprising a storage battery, an energy storage converter, a monitoring circuit and a controllable switch, wherein the controllable switch is connected between a utility grid and an alternating current bus, the energy storage converter is connected to the storage battery and the alternating current bus respectively, the monitoring circuit is connected to the energy storage converter and the controllable switch respectively;

wherein the monitoring circuit is configured to monitor an operating state of the utility grid and output a first monitoring signal when the utility grid is normal, and output a second monitoring signal when the utility grid is abnormal, the controllable switch is configured to be switched on under control of the first monitoring signal so that the microgrid system operates in parallel to the utility grid and enters a grid-connected mode, and the controllable switch is further configured to be switched off under control of the second monitoring signal, so that the microgrid system independently supplies power to a load and enters an island mode;

wherein the energy storage converter comprises a main circuit configured to process an output voltage of the storage battery for grid-connected operation or supplying power to the load, and a control circuit configured to control an output of the main circuit and comprising an outer voltage loop unit, a mode switching switch, and an inner current loop unit;

wherein a first input end of the inner current loop unit is connected to an output end of the energy storage converter, to receive an output current feedback value of the energy storage converter, a second input end of the inner current loop unit is connected to a fixed end of the mode switching switch, an output end of the inner current loop unit is connected to the main circuit, and a first contact of the mode switching switch is configured to receive a specified inner current loop current value;

wherein a first input end of the outer voltage loop unit is connected to the output end of the energy storage converter, to receive an output voltage feedback value of the energy storage converter, a second input end of the outer voltage loop unit is configured to receive a specified outer voltage loop voltage value, a third input end of the outer voltage loop unit is connected to the utility grid through the controllable switch, to receive a utility grid current value, a fourth input end of the outer voltage loop unit is configured to receive the specified inner current loop current value, an output end of the outer voltage loop unit is connected to a second contact of the mode switching switch, and the outer voltage loop unit is configured to generate a specified current loop signal when the microgrid system is switched from the grid-connected mode to the island mode, based on the specified inner current loop current value input by the fourth input end of the outer voltage loop unit, the utility grid current value input by the third input end of the outer voltage loop unit, the specified outer voltage loop voltage value input by the second input end of the outer voltage loop unit and the output voltage feedback value of the energy storage converter input by the first input end of the outer voltage loop unit; and wherein the mode switching switch is configured to be switched to the first contact under control of the first monitoring signal, the inner current loop unit generates a control signal based on the specified inner current loop current value input by the first contact and the output current feedback value of the energy storage converter, to control the energy storage converter to output a constant power, the mode switching switch is further configured to be switched to the second contact under control of the second monitoring signal, and the inner current loop unit generates a control signal based on the specified current loop signal output by the outer voltage loop unit and the output current feedback value of the energy storage converter, to control an output voltage and frequency of the energy storage converter to be constant.

2. The microgrid system according to claim 1, wherein the main circuit comprises a converter; the control circuit further comprises a driving signal generator connected between the output end of the inner current loop unit and a control end of the converter, and configured to generate a corresponding driving signal based on the control signal, to control the converter.

3. The microgrid system according to claim 2, wherein the main circuit further comprises a filtering circuit connected between an output end of the converter and the alternating current bus, and configured to perform filtering processing of an output of the converter.

4. The microgrid system according to claim 2, wherein the inner current loop unit comprises a current loop adder and a current loop controller connected in series, an output end of the current loop adder is connected to the current loop controller, an output end of the current loop controller is connected to the driving signal generator, the current loop adder is configured to subtract input signals of the first input end and the second input end from each other to obtain an error signal, and the current loop controller is configured to generate the control signal based on the error signal.

5. The microgrid system according to claim 4, wherein the outer voltage loop unit comprises a first voltage loop adder, a voltage loop controller and a second voltage loop adder connected in series, the voltage loop controller is connected between the first voltage loop adder and the second voltage loop adder, the first voltage loop adder is configured to subtract voltage signals input by the first input end and the second input end from each other to obtain a voltage error value, the voltage loop controller is configured to generate a control quantity based on the voltage error value, and the second voltage loop adder is configured to generate the specified current loop signal by adding together the utility grid current value input by the third input end, the specified inner current loop current value input by the fourth input end and the control quantity.

6. The microgrid system according to claim 5, wherein the current loop controller and the voltage loop controller are both PI regulators.

7. The microgrid system according to claim 5, wherein the inner current loop unit further comprises a first three-phase static coordinate system to two-phase rotary coordinate system converting module and a two-phase rotary coordinate system to three-phase static coordinate system converting module, the current loop adder comprises a current loop d-axis adder and a current loop q-axis adder, the current loop controller comprises a current loop d-axis controller and a current loop q-axis controller, an input end of the first three-phase static coordinate system to two-phase rotary coordinate system converting module is connected to the output end of the energy storage converter, an output end of the first three-phase static coordinate system to two-phase rotary coordinate system converting module is connected to the current loop d-axis adder and the current loop q-axis adder respectively, the first three-phase static coordinate system to two-phase rotary coordinate system converting module is configured to convert a three-phase current output by the energy storage converter to generate a d-axis current and a q-axis current, an input end of the two-phase rotary coordinate system to three-phase static coordinate system converting module is connected to output ends of the current loop d-axis controller and the current loop q-axis controller respectively, an output end of the two-phase rotary coordinate system to three-phase static coordinate system converting module is connected to the driving signal generator, and the two-phase rotary coordinate system to three-phase static coordinate system converting module is configured to convert a quantity output by the current loop d-axis controller and a quantity output by the current loop q-axis controller into a three-phase modulated signal, and output the three-phase modulated signal to the driving signal generator, to generate a driving control signal for the converter;

wherein the outer voltage loop unit further comprises a second three-phase static coordinate system to two-phase rotary coordinate system converting module and a third three-phase static coordinate system to two-phase rotary coordinate system converting module, the first voltage loop adder comprises a first voltage loop d-axis adder and a first voltage loop q-axis adder, the voltage loop controller comprises a voltage loop d-axis controller and a voltage loop q-axis controller, the second voltage loop adder comprises a second voltage loop d-axis adder and a second voltage loop q-axis adder, an input end of the second three-phase static coordinate system to two-phase rotary coordinate system converting module is connected to the output end of the energy storage converter, an output end of the second three-phase static coordinate system to two-phase rotary coordinate system converting module is connected to input ends of the first voltage loop d-axis adder and the first voltage loop q-axis adder respectively, the second three-phase static coordinate system to two-phase rotary coordinate system converting module is configured to convert a three-phase voltage output by the energy storage converter to generate a d-axis voltage and a q-axis voltage, an input end of the third three-phase static coordinate system to two-phase rotary coordinate system converting module is configured to receive a utility grid current, an output end of the third three-phase static coordinate system to two-phase rotary coordinate system converting module is respectively connected to the second voltage loop d-axis adder and the second voltage loop q-axis adder, the third three-phase static coordinate system to two-phase rotary coordinate system converting module is configured to convert a three-phase current of the utility grid to generate a d-axis current and a q-axis current, the specified inner current loop current value comprises a specified inner current loop d-axis current value and a specified inner current loop q-axis current value, and the specified outer voltage loop voltage value comprises a specified outer voltage loop d-axis voltage value and a specified outer voltage loop q-axis voltage value; and wherein the mode switching switch comprises a d-axis mode switching switch connected between the current loop d-axis adder and the second voltage loop d-axis adder, and a q-axis mode switching switch connected between the current loop q-axis adder and the second voltage loop q-axis adder.

8. The microgrid system according to claim 1, wherein the microgrid system further comprises a photovoltaic power generation module comprising a photovoltaic cell module and a photovoltaic inverter connected to the photovoltaic cell module, and the photovoltaic power generation module is configured to convert light energy into electric energy to supply power to the load, and output the electric energy to a power grid or the storage battery when the generated electric energy is greater than an electric quantity required by the load.

9. The microgrid system according to claim 1, wherein the microgrid system further comprises a main controller configured to acquire an importance level of the load, and distribute electric energy based on the importance level of the load when the microgrid system is in the island mode.

10. A control method for controlling the microgrid system according to claim 1 to be switched between the grid-connected mode and the island mode, the method comprising:

monitoring the operating state of the utility grid;

determining whether or not the utility grid is in the normal state;

controlling the controllable switch to be switched on if the utility grid is in the normal state, so that the microgrid system operates in parallel to the utility grid operate and enters the grid-connected mode, wherein the mode switching switch is controlled to be switched to the first contact, the inner current loop unit generates the control signal based on the specified inner current loop current value input by the first contact and the output current feedback value of the energy storage converter, to control the energy storage converter to output the constant power, the outer voltage loop unit generates the specified current loop signal when the microgrid system is switched from the grid-connected mode to the island mode, based on the specified inner current loop current value input by the fourth input end of the outer voltage loop unit, the utility grid current value input by the third input end of the outer voltage loop unit, the specified outer voltage loop voltage value input by the second input end of the outer voltage loop unit and the output voltage feedback value of the energy storage converter input by the first input end of the outer voltage loop unit, and the specified current loop signal does not participate in a control process of the inner current loop unit during grid connection; and controlling the controllable switch to be switched off if the utility grid is not in the normal state, so that the microgrid system independently supplies power to the load and enters the island mode, wherein the mode switching switch is controlled to be switched to the second contact from the first contact, the specified current loop signal generated during grid connection is output to the inner current loop unit by the outer voltage loop unit; and the inner current loop unit generates the control signal based on the output current feedback value of the energy storage converter and the specified current loop signal output by the outer voltage loop unit, to control the output voltage and frequency of the energy storage converter to be constant.

* * * * *